United States Patent
Zeng et al.

(10) Patent No.: US 6,836,176 B2
(45) Date of Patent: *Dec. 28, 2004

(54) CHARGE PUMP RIPPLE REDUCTION

(75) Inventors: Raymond W. Zeng, Folsom, CA (US); Ravi P. Annavajjhala, Folsom, CA (US); Mary Frances Therese B. Yuvienco, Las Pinas (PH)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/185,419

(22) Filed: Jun. 27, 2002

(65) Prior Publication Data

US 2003/0122610 A1 Jul. 3, 2003

Related U.S. Application Data

(63) Continuation-in-part of application No. 10/038,499, filed on Jan. 2, 2002, now Pat. No. 6,605,984.

(51) Int. Cl.[7] .............................. G05F 1/576; G06F 1/26
(52) U.S. Cl. .................... 327/535; 327/544; 365/189.09
(58) Field of Search ................................ 327/534–538, 327/544; 365/189.09, 227; 363/59, 60; 331/57

(56) References Cited

U.S. PATENT DOCUMENTS

| | | | |
|---|---|---|---|
| 5,272,453 A | * 12/1993 | Traynor et al. | 331/57 |
| 5,301,150 A | 4/1994 | Sullivan et al. | 365/185.08 |
| 5,352,936 A | 10/1994 | Allen | 327/530 |
| 5,414,669 A | 5/1995 | Tedrow et al. | 365/226 |
| 5,442,586 A | 8/1995 | Javanifard et al. | 365/185.29 |
| 5,455,794 A | 10/1995 | Javanifard et al. | 365/185.18 |
| 5,517,138 A | 5/1996 | Baltar et al. | 326/105 |
| 5,553,030 A | * 9/1996 | Tedrow et al. | 365/226 |
| 5,553,295 A | * 9/1996 | Pantelakis et al. | 365/226 |
| 5,602,794 A | 2/1997 | Javanifard et al. | 365/226 |
| 5,732,039 A | 3/1998 | Javanifard et al. | 365/226 |
| 5,767,735 A | 6/1998 | Javanifard et al. | 327/536 |
| 5,781,473 A | 7/1998 | Javanifard et al. | 365/185.18 |
| 5,818,766 A | * 10/1998 | Song | 327/536 |
| 5,937,063 A | 8/1999 | Davis | 713/187 |
| 5,946,258 A | 8/1999 | Evertt et al. | 365/226 |
| 6,018,264 A | * 1/2000 | Jin | 327/536 |
| 6,429,732 B1 | * 8/2002 | Tedrow et al. | 327/548 |
| 6,525,972 B2 | * 2/2003 | Yanagisawa | 365/189.09 |
| 6,642,774 B1 | * 11/2003 | Li | 327/536 |

* cited by examiner

*Primary Examiner*—Timothy P. Callahan
*Assistant Examiner*—Terry L. Englund
(74) *Attorney, Agent, or Firm*—Fish & Richardson P.C.

(57) ABSTRACT

A charge pump control circuit may include a frequency synthesis device, a pump cell connected to the frequency synthesis device, and a feedforward circuit connected to the frequency synthesis device to selectively activate or deactivate the frequency synthesis device in response to a pump cell output signal.

33 Claims, 8 Drawing Sheets

Prior art

CHARGE PUMP RIPPLE REDUCTION

CROSS REFERENCE TO RELATED APPLICATIONS

This is a continuation in part application of the following pending U.S. nonprovisional application, incorporated herein by reference: Ser. No. 10/038,499, entitled "Charge Pump Ripple Reduction," filed Jan. 2, 2002 and issued as U.S. Pat. No. 6,605,984 on Aug. 12, 2003.

BACKGROUND

There has been a recent trend toward reducing the power requirements of portable computers. In order to lower power consumption, much of the integrated circuitry used in personal computers is being redesigned to function at lower voltage levels. Some of the circuitry used in portable computers is being designed to operate at low voltage levels, such as 5 volts and 3.3 volts. This helps to reduce the power needs of such computers.

Flash electrically erasable programmable read only memory (flash EEPROM memory) has recently been used to store the basic input/output startup (BIOS) processes for personal computers, and in particular for portable personal computers. However, erasing and programming the cells of a flash EEPROM memory array requires very accurate voltages. The voltages provided by charge pumps and other circuitry implemented as part of integrated circuits, including voltage reference circuits, typically vary due to factors such as operating temperatures, supply voltages, process variations, and load currents. Moreover, when charge pumps are used to supply the voltage, the voltage level provided at the output terminal of a charge pump tends to vary substantially from a desired voltage value.

A problem encountered when using charge pumps derives from the typical circuit topology, which consists of a series of one or more charge pump cells, each cell having an output including a series diode and a storage capacitance. In such a topology, each charge pump cell transfers charge to its storage capacitance only when its series diode is forward-biased. This leads to significant output voltage ripple when load currents are high relative to charge pump storage capacitance. A large ripple voltage may exacerbate power supply noise within an IC, such as a flash EEPROM, by producing pulsating currents. The inductance of the IC bond wires and lead frames may convert pulsating currents into voltage spikes within the IC. The resulting voltage variation within the IC may be sufficient to cause erroneous internal switching of devices and device misoperation. It is therefore desirable to smooth the output voltage that charge pumps provide.

DESCRIPTION OF DRAWINGS

Like reference symbols in the various drawings indicate like elements.

DETAILED DESCRIPTION

Described below are various integrated and discrete circuit approaches that reduce charge pump output ripple voltage by using two schemes, either alone or in combination. When applied simultaneously, these two schemes may combine in certain embodiments to provide improved charge pump ripple voltage over currently available charge pump approaches.

In a first scheme, feedforward control may be used to reduce the ripple in charge pump output in certain embodiments. In one illustrative embodiment, a differential amplifier is fed by a reference voltage and feedback from the charge pump output. The differential amplifier may bias a voltage-controlled oscillator (VCO), which in turn may drive a clock driver and associated pump cells. The VCO may selectively activate and deactivate the clock driver and pump cells by providing a drive signal only when the feedback signal to the differential amplifier is within a specified voltage range relative to the reference. In accordance with the present invention, a comparator, fed by the reference and feedback signals, may selectively activate or deactivate the VCO and clock driver with a feedforward signal when the pump output crosses a desired threshold, such as the reference voltage.

In a second scheme, multiple arrays of charge pump cells may be operated as phase-shifted parallel charge pump cells that transfer charge to the output storage capacitance at staggered times so as to reduce output ripple voltage. An exemplary high current charge pump having two arrays for flash EEPROMS is presented which provides for both an intermediate supply voltage "algorithm" mode, featuring high current capability, and a higher supply voltage "slew" mode. During slew mode, the arrays may be series-connected to increase output voltage using a conventional clocking scheme to control the charge pump cells. However, when the EEPROM is in algorithm mode to program or erase, the two arrays may supply parallel outputs that are phase-shifted so that they may alternately transfer charge to the output storage capacitance. In accordance with the present invention, switching to phase-shifted parallel outputs may be accomplished by multiplexing two pairs of clock inputs, the second pair being out-of-phase (e.g., about 180 degrees out-of-phase) with the first clock input pair. Multiplexer circuits that are adapted to switch between certain phases of the clock may implement the signal switching. After the multiplexers switch the clock signals, the output from the second array is about 180 degrees out-of-phase with the output from the first array. This effectively reduces charge pump output voltage ripple in a preferred embodiment to about 400 mV peak-to-peak or less.

Figure 1:
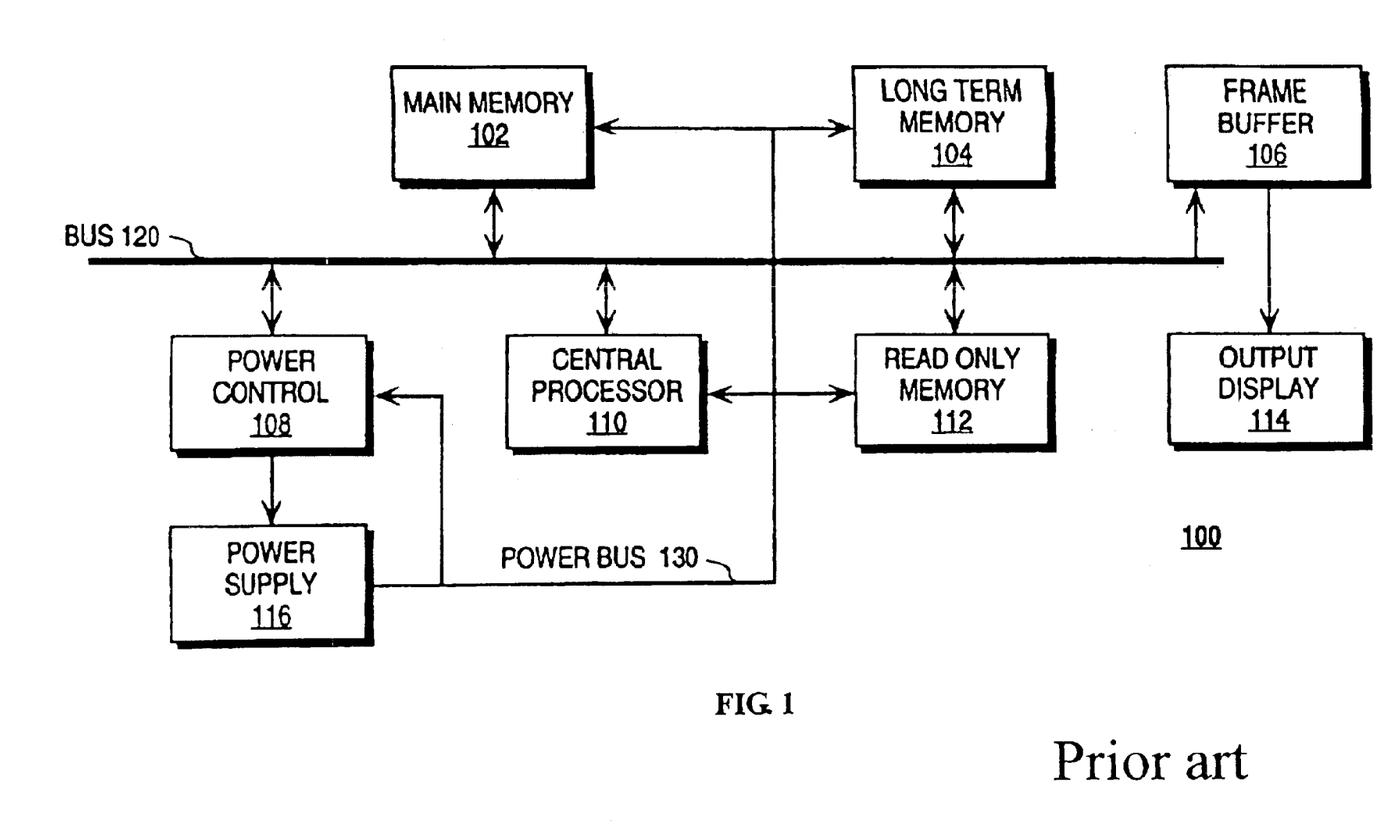
FIG. 1 is a block diagram illustrating a computer system that may utilize the present invention.

FIG. 1 shows an exemplary computer system 100 into which a charge pump control circuit in accordance with the present invention may be incorporated. The system 100 includes a central processor 110 which carries out the various instructions provided to the computer system 100 for its operations. The central processor 110 is joined to a bus 120 adapted to carry information to various components of the system 100. Joined to the bus 120 is main memory 102. Typically, main memory 102 is constructed of dynamic random access memory, arranged in a manner, as is well known to those skilled in the prior art, to store information while power is provided to the system 100. Also joined to the bus 120 is read-only memory 112, which may include various memory devices that are also well known to those skilled in the art. Each such memory device is adapted to retain a particular memory condition in the absence of power to the system 100. The read-only memory 112 typically stores various basic functions used by the processor 110, such as basic input/output processes and startup processes typically referred to as BIOS processes. Such read-only memory 112 may be constructed of flash EEPROM memory cells adapted to have its contents reprogrammed when various BIOS processes in a particular computer are changed. If the read-only memory 112 is constructed of flash EEPROM memory cells, it may be modified by running an update process on the computer itself to reprogram the values stored in the read-only memory 112. Typically, such flash EEPROM memory may include circuitry required to erase and program the memory array.

Also connected to the bus 120 are various peripheral components such as long term memory 104 and circuitry such as a frame buffer 106. Data may be written to frame buffer 106 before being transferred to an output device such as monitor 114 for display. The long term memory 104 is typically one or more electro-mechanical hard disk drives. However, rather than a typical electromechanical hard disk drive, a flash EEPROM memory array may be used as the long term memory 104. But, programming and erasing such flash EEPROM memory arrays generally requires supply voltages greater than those typically available from the regulated power supply 116 of the type often used in advanced, low-power, portable computers. Whereas flash EEPROM memory arrays typically include circuitry for programming and erasing the memory array, they may also include circuitry for generating the necessary higher voltages from the available lower voltages. A charge pump control circuit in accordance with the present invention provides improved approaches for using charge pumps to generate the well-regulated voltages needed to erase and program flash EEPROMs.

Circuitry is also shown in FIG. 1 by which power may be supplied through a power bus 130 to various components of the system 100. This includes, in the exemplary embodiment, a power control circuit 108 that controls the various states in which power supply 116 provides power to system 100. In a typical portable computer, power supply 116 includes a battery for furnishing power to the system 100. In any particular arrangement, power control circuit 108 may actually be a part of a particular portion of the circuit of FIG. 1. For example, if read-only memory 112 were to be constructed of flash EEPROM memory devices, power control circuit 108 and associated voltage reference circuitry, might be integrated with read-only memory 112 on the same IC.

As noted above, charge pumps may be integrated within flash EEPROM arrays, according to known methods, to supply voltages needed to accomplish erase and program operations of flash memory when such voltages are not available from an external source. EEPROM arrays with integrated charge pumps may accordingly be used as long term memory 104 or read-only memory 112, for example.

Figure 2:
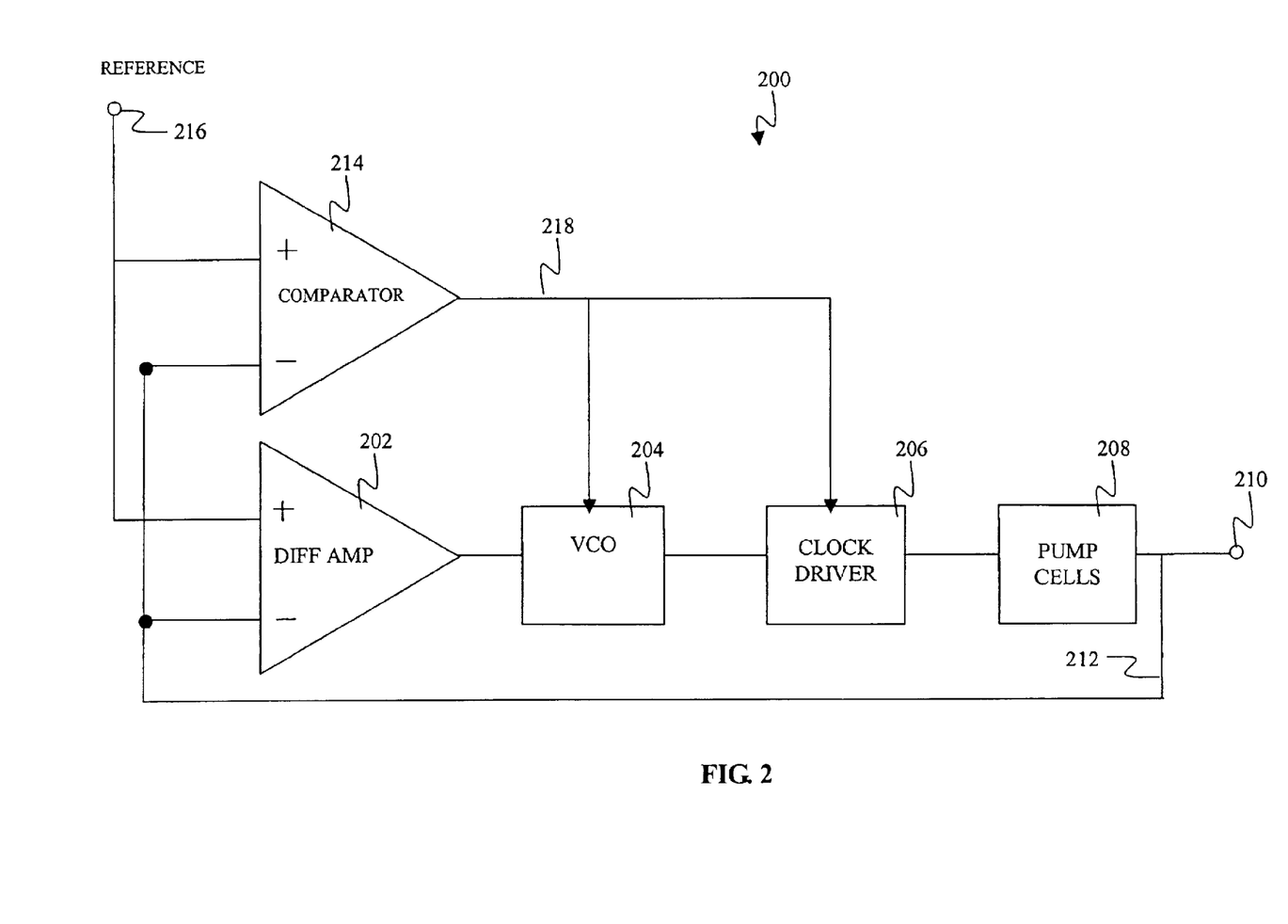
FIG. 2 is a circuit diagram illustrating a first embodiment of a ripple reduction circuit that may be used in the system of FIG. 1.

FIG. 2 illustrates an exemplary control circuit 200 that may be used in connection with the flash EEPROM devices discussed above. In the depicted embodiment, the circuit 200 may reduce ripple in the output of charge pump cells 208 by using charge pump feedback and/or comparator feedforward to selectively activate and deactivate pump cells 208. Differential amplifier 202 may receive at its positive, or non-inverting, input node a reference signal from reference input 216. The reference signal may be a function of the desired charge pump output voltage. Differential amplifier 202 may also receive a feedback signal on feedback line 212 from the charge pump output 210. Differential amplifier 202 may output a bias signal to cause a VCO 204 to synthesize an output signal having a particular frequency. The VCO 204 may have an upper threshold limit voltage which, when exceeded by the bias signal output from the differential amplifier 202, deactivates the VCO 204. When the bias signal is below the VCO's upper threshold level, the VCO 204 may supply its output signal to a clock driver 206. Clock driver 206, which may optionally have four outputs, may convert the VCO 204 output signal into four clock signals having a plurality of different phases. These clock driver 206 output signals may serve as the input clock signals to pump cells 208, which may optionally be part of a high voltage charge pump or high current charge pump. The voltage at the output 210 may increase incrementally with each cycle of one or more of the clock inputs until the output reaches a level that provides a differential amplifier bias signal above the upper threshold limit voltage. Upon receipt of such a signal, the VCO may be deactivated, which may in turn deactivate the clock driver 206 and pump cells 208.

The circuit 200 also includes a feedforward system that may optionally be used to deactivate the clock driver and further reduce output ripple. Comparator 214, like differential amplifier 202, may be driven by a reference signal from node 216 and the feedback signal from the pump cells 208. Comparator 214 may produce a high on feedforward signal 218 when pump feedback 212 is below reference voltage 216, and it may produce a low on feedforward signal 218 when pump feedback 212 is above reference voltage 216. Both the VCO 204 and the clock driver 206 may receive and process feedforward signal 218. When it is low, feedforward signal 218 may reset VCO 204 and deactivate clock driver 206.

Figure 3:
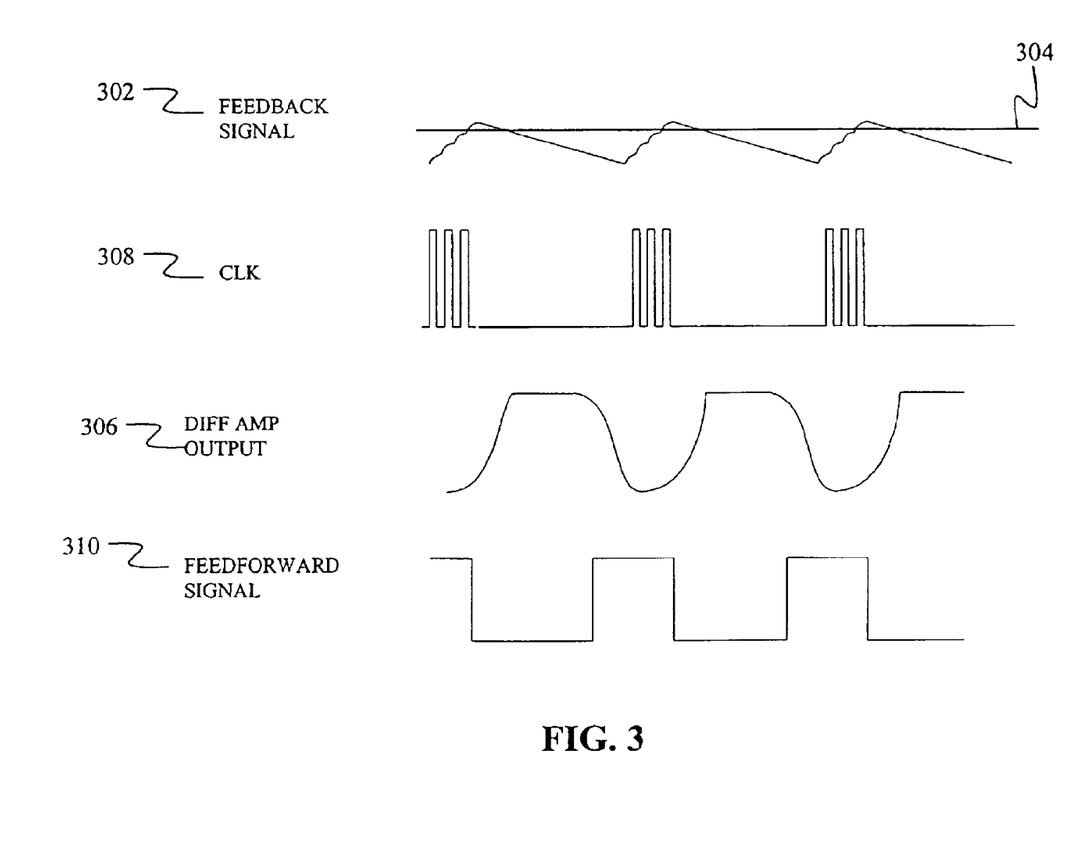
FIG. 3 depicts the output waveforms for the pump cells, clock driver, differential amplifier, and comparator of FIG. 2.

With reference to the exemplary embodiment of FIG. 2, FIG. 3 depicts the cyclic relationship among the feedback signal 302, the clock driver oscillation 308, the differential amplifier output 306, and the feedforward signal 310. When the feedback signal 302 exceeds reference value 304, feedforward signal 310 may be driven low. That in turn may deactivate clock driver 206, which may discontinue clock signal 308. Then, feedback signal 302 then may begin to decay as the load draws charge from the output storage capacitance. Without the feedforward signal 310, the VCO 204 and clock driver 206 of FIG. 2 may continue driving the pump cells until the differential amplifier output signal 310 exceeded the voltage threshold of the VCO 204. By feeding the charge pump output voltage 210 back to the differential amplifier 202 through a resistive voltage divider (not shown), this particular embodiment of the feedforward signal may be configured to limit the pump cell output voltage 210 to an approximate multiple of the reference value 304. Limiting the pump cell voltage in this manner, in accordance with the present invention, may decrease the aggregate ripple of the output voltage 302 relative to the ripple that would be observed in a circuit without such a feedforward arrangement.

Figure 4:
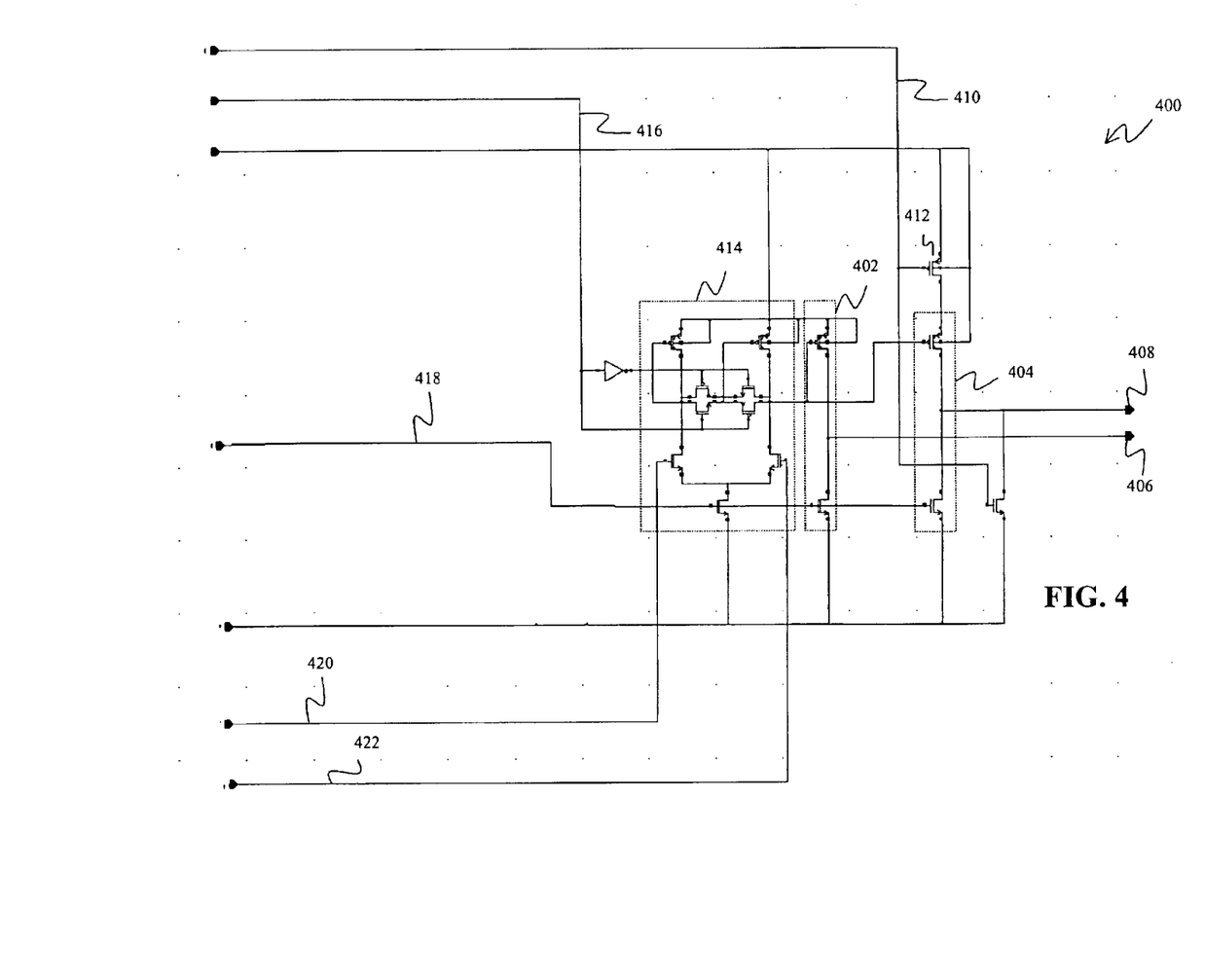
FIG. 4 is a circuit diagram of an illustrative differential amplifier and comparator for use in connection with the circuit of FIG. 2.

FIG. 4 depicts a circuit that may be used as the differential amplifier 202 and comparator 214 in the control system of FIG. 2. The combined comparator/differential amplifier circuit 400 may include two output stages 402, 404 which feed a differential amplifier output 406 and comparator output 408. A feedforward enable line 410 and an associated PMOS device 412 may control the comparator output stage 404. A gain enabling line 416 and a base enabling line 418 may control the differential amplifier stage 414. The reference signal 304 may be provided on reference line 420 and the feedback signal 302 may be provided on feedback line 422, both of which may serve as inputs to the differential amplifier stage 414. The feedback signal 302 may be generated by passing the pump cell output voltage through a resistive voltage divider (not shown) such that the feedback signal 302 may be, for example, about one ninth of the pump cell output. The comparator output 408 may be connected to an inverter (not shown) and the differential amplifier output 406 may be connected to a diode connected PMOS (not shown). The output stages 402 and 404 may be matched in size.

In operation, the gain enable line 416 may provide a gain control signal which, when high, puts the differential amplifier stage 414 into a high gain mode. The feedforward enable line 410 may provide a feedforward enabling signal which, when low, may provide the supply voltage to the PMOS 412, and thereby activate the comparator output stage 404 and provide a comparator output signal at the comparator output 408. The differential amplifier output signal 306 shown in FIG. 3 corresponds to the signal emitted from the diode-connected PMOS connected to the differential amplifier output. The feedforward signal 310 corresponds to the output of the inverter connected to the comparator output node 408.

Figure 5:
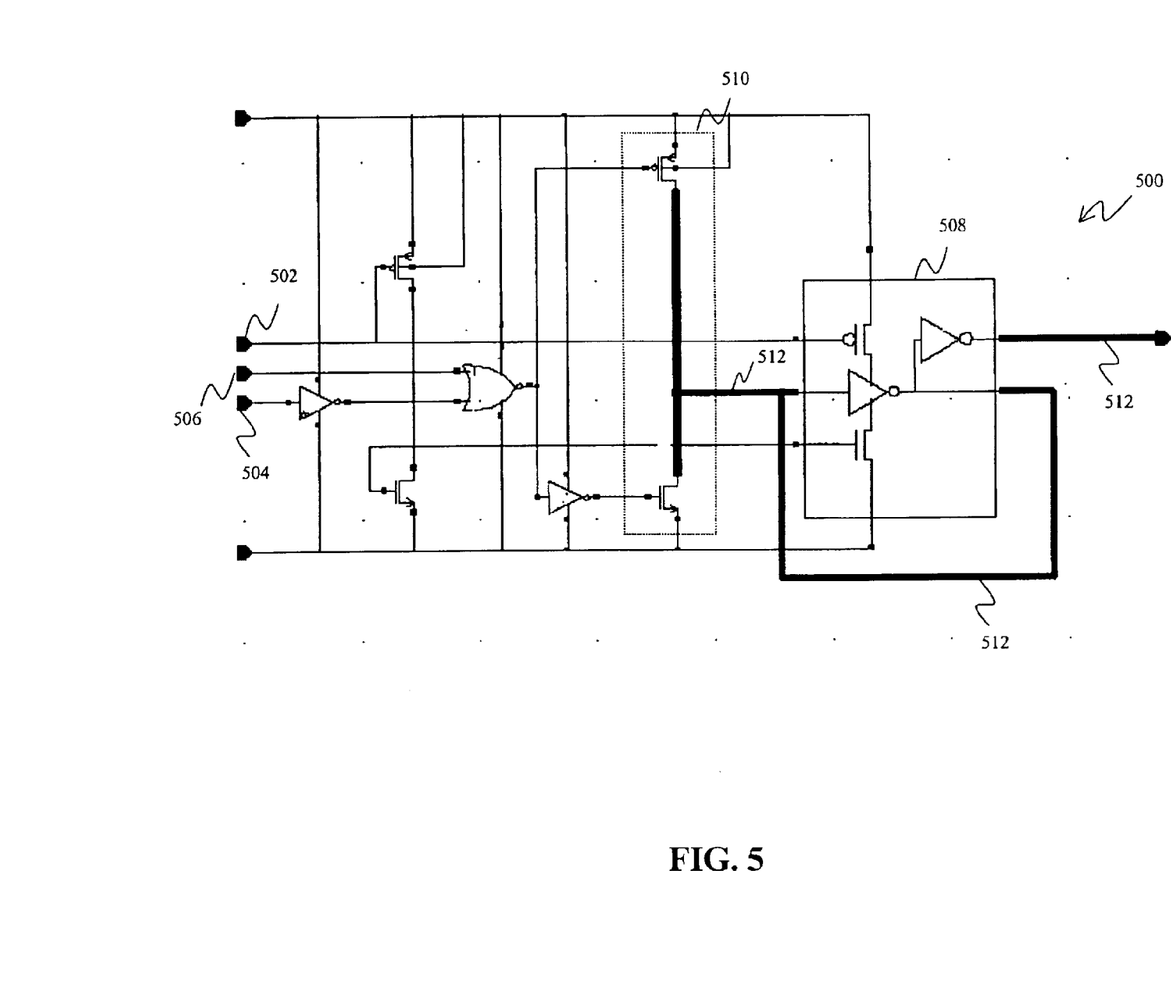
FIG. 5 is a circuit diagram of an illustrative VCO for use in connection with the circuit of FIG. 2.

FIG. 5 is a circuit diagram of a VCO 500 that may be used in connection with the circuit of FIG. 2. Input 502 may receive the differential amplifier output signal 306, whereas input 504 may receive the feedforward signal 310. Input 506 provides a high current charge pump reset signal through a CMOS pair 510. Bus lines 512 may connect nine similarly constructed oscillator stages 508, one of which is shown. The oscillator stages 508 may be connected in series, with the output of the last stage being fed back to the first stage.

In operation, the VCO 500 may output a high frequency oscillating signal due to the feedback of the oscillator stages 508. The feedforward signal 310 on input 504, when low, may operate to reset and clamp the oscillator output to a known value. The current charge pump reset signal 506, when high, may similarly reset the oscillator stages 508 through the CMOS pair 510. A rising differential amplifier output signal 306 on input 502 may slow the oscillator stages 508 and ultimately shut them off as the signal rises above a threshold value of about Vcc/2. Accordingly, the VCO 500 may output a high frequency oscillating signal until a low feedforward signal 310 is received, a high current charge pump reset signal is received, or the differential amplifier output signal 306 exceeds about Vcc/2.

Figure 6:
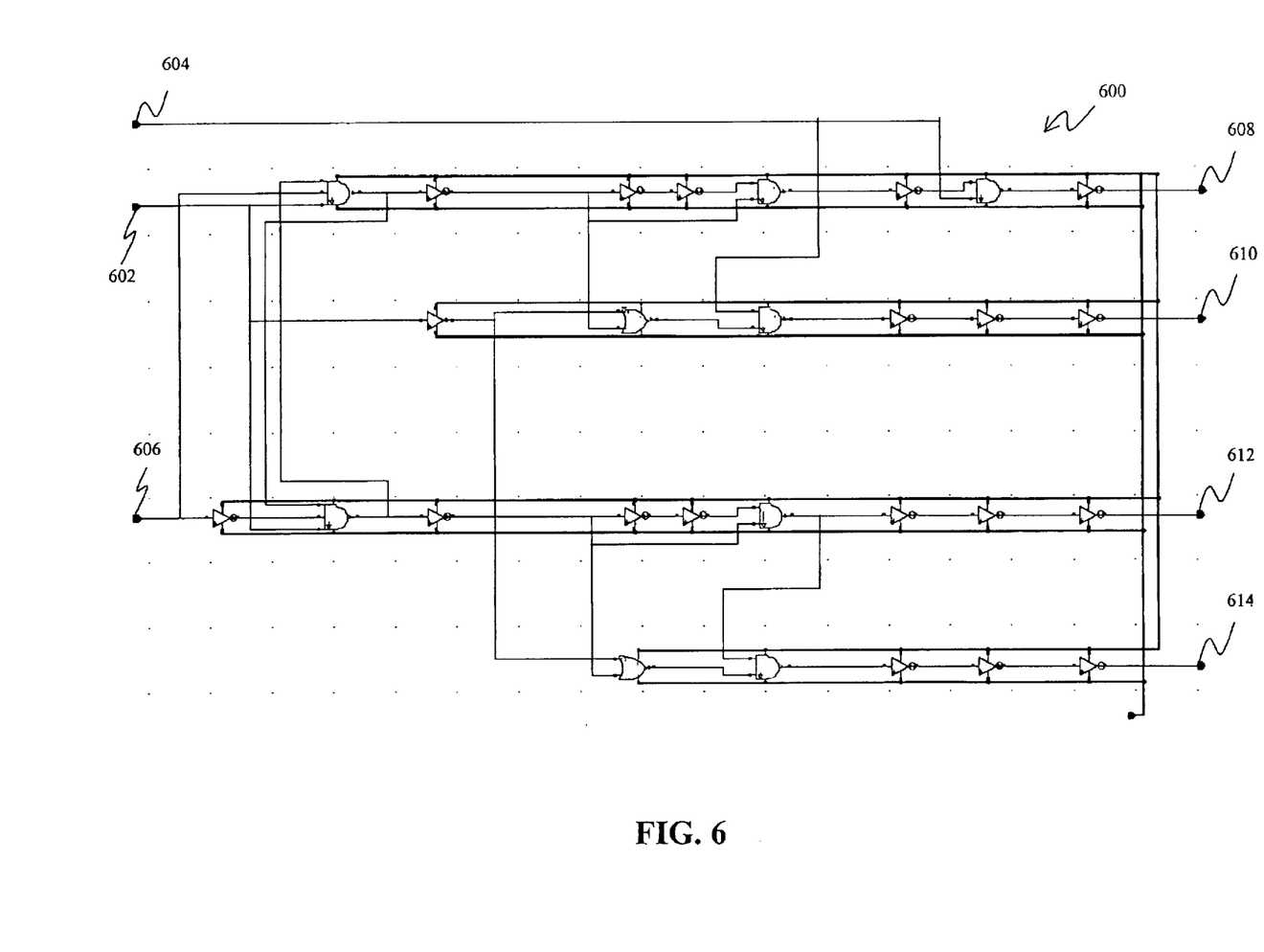
FIG. 6 is a circuit diagram of an illustrative differential clock driver for use in connection with the circuit of FIG. 2.

FIG. 6 is a circuit diagram of an illustrative four-phase clock driver 600 for use in connection with the circuit of FIG. 2. Input 602 may receive the high current charge pump reset signal 506 (discussed above), input 604 may receive the feedforward signal 310, and input 606 may receive one of the outputs from oscillator stages 508. In operation, the gate array depicted in FIG. 6 may provide four different clock signals at output nodes 608–614. The clock signals provided at outputs 608 and 614 may be in-phase, but the signal at output 608 may have a shorter duty cycle. Similarly, the clock signals provided at outputs 610 and 612 may be in-phase, but the signal at output 612 may have a shorter duty cycle. The clock signals are preferably non-overlapping.

The feedforward signal 310, when low, may drive and hold the clock signal at output 608 low. In one arrangement, the clock signal at output 608 may drive the output stage of the pump cells. Accordingly, a low feedforward signal 310, in this embodiment, may deactivate the pump cells 208.

The exemplary circuits shown in FIGS. 2 and 4–6 may reduce ripple, particularly in the feedforward control mode. The topology of the particular circuits may also permit the use of high gain differential amplifiers to regulate the voltage at high output currents. The illustrative circuits may also permit a reduction in size or elimination of compensation capacitors, which are often used at the pump output to reduce ripple. That in turn may reduce the area of the circuit and result in considerable cost savings, particularly in integrated circuit designs. The circuits may also provide significantly improved pump slew rates due to reduction in output storage capacitance, which permits the pump arrays sizes to be reduced and thereby provides additional cost savings. The reduction in ripple may also reduce power consumption, which may be particularly advantageous where heat and battery life are design-limiting criteria.

In other embodiments, the differential amplifier may be separate components. In such embodiments, the differential amplifier may be replaced with a comparator, inverting or noninverting amplifier, or other suitable circuit element or combination of components. Likewise, the comparator may be replaced with a differential amplifier, inverting or non-inverting amplifier, or other suitable components(s). As another example, the differential amplifier and comparator shown in FIG. 2 may be replaced with a single amplifier if the appropriate VCO and clock driver control circuits are provided.

The VCO and clock driver may be substituted with any suitable frequency synthesis device such as multivibrators, voltage to frequency converters (VFCs), oscillators, timers, counters, and the like, or combinations thereof. The reference signal may be readily altered or omitted entirely in various embodiments.

Optionally, the circuit may be arranged so as to toggle between a first mode, wherein the pump cells may be deactivated or activated in response to the differential amplifier bias signal, and a second mode, wherein the pump cells may be deactivated or activated in response to the feedforward signal.

The topologies shown in FIGS. 4–6 are merely exemplary embodiments that may be used for certain VCOs and clock drivers. Other topologies may be used in other implementations or for other frequency synthesis devices. For instance, the circuits shown in FIGS. 5–6 may be replaced with other suitable ICs, including PLA, PAL, PGA, decoder, inverter chain, and combinational logic components. Bipolar junction transistors may also be used in place of MOSFETs.

The circuits described herein may optionally be implemented in the digital domain, the analog domain, or in a mixed-mode implementation. For example, an analog feedforward signal may be used.

The control circuits discussed above may also be used to disable clock or drive signals transmitted to other integrated or discrete components, such as phase lock loops (PLLs). Many such components may be selectively enabled or disabled with the feedforward techniques described herein.

Figure 7:
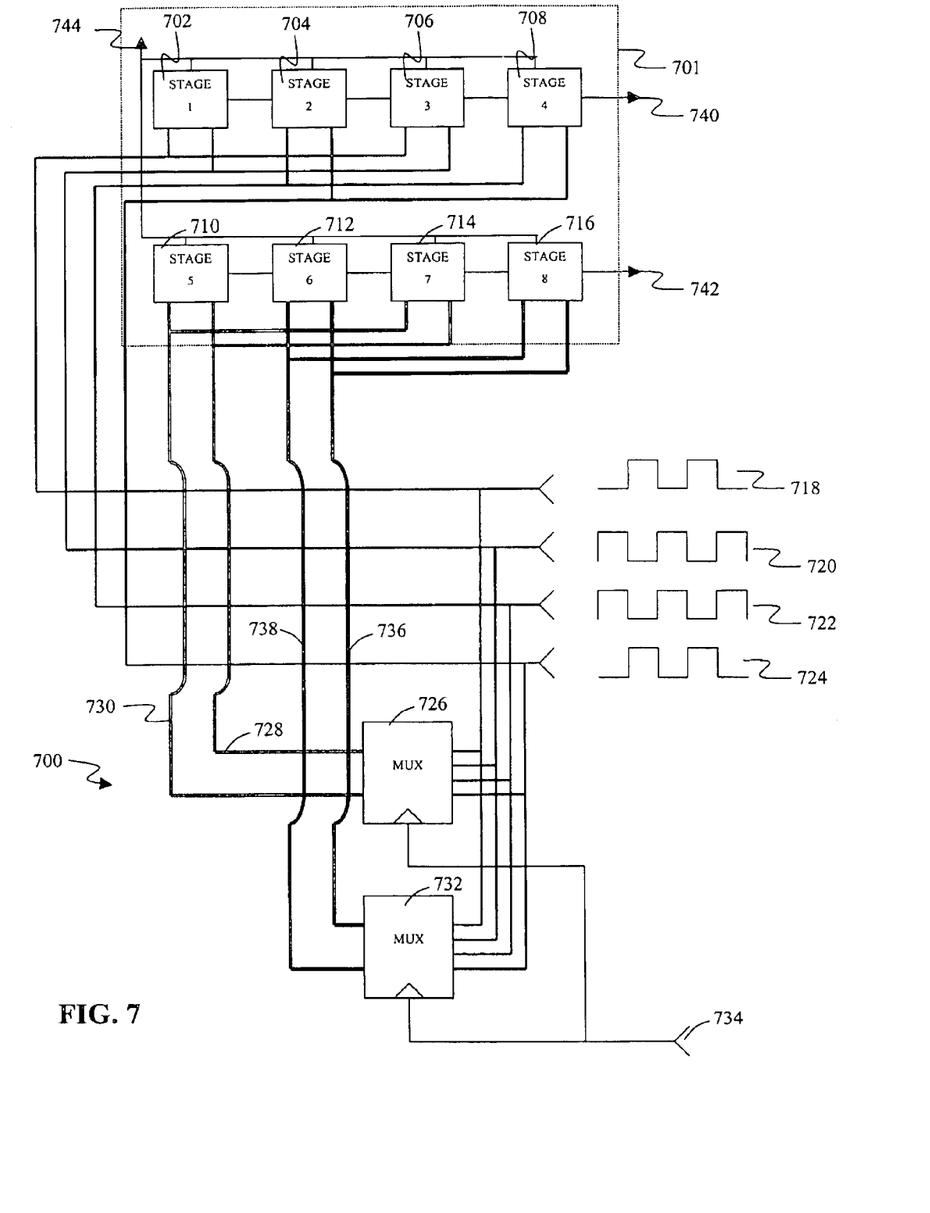
FIG. 7 is a circuit diagram illustrating a second embodiment of a ripple reduction circuit that may be used in the system of FIG. 1; and, FIG. 8 is a circuit diagram illustrating a multiplexing circuit that may be used in the circuit of FIG. 7.

FIG. 7 illustrates an improved charge pump circuit 700 that may be incorporated into a flash EEPROM array that may be used as long term memory 104 or read-only memory 112. In the depicted embodiment, the circuit 700 may reduce ripple in the output of a high current charge pump 701 by staggering the times at which charge is drawn from each of the pump's two arrays whenever it is in programming or in erase algorithms. The two arrays may be controlled by a first pair of clock inputs 718, 720 and a second pair of clock inputs 722, 724, where the second pair may be about 180 degrees out-of-phase with the first pair, in this exemplary embodiment. The clock inputs may cause the respective stages alternately to accumulate and then to transfer, or "dump," charge. When the circuit 700 is in slew mode, the high current charge pump may charge an associated low current charge pump (not shown) connected in series to achieve a high voltage. In this mode, circuit 701 may be configured as a single array pump by connecting output 740 to the input of circuit 710. This may be accomplished with an n-channel FET switch (not shown) activated by an enabling line 734, which may be a level-shifted or logic-level signal. This type of connection allows the high current charge pump to help the low current charge pump to reach a higher voltage level output. In slew mode, stages 1, 3, 5 and 7 may accumulate charge in response to a first clock signal 718 and then, in response to a second clock signal 720, dump their charge to stages 2, 4, 6, and 8, respectively. In similar fashion, the second pair of clock signals 722, 724 may cause stages 2, 4, 6, and 8 alternately to accumulate charge and then to discharge. The discharges from stages 4 and 8 may occur simultaneously because the same pair of clock signals controls stages 4 and 8. In this case, the simultaneous discharge may not pose a problem because outputs 740 and 742 are connected to different nodes—output 740 feeds circuit 710 and the pump output 742 feeds, for example, the low current charge pump.

When the EEPROM is in a programming or erase algorithm mode, the pump may be reconfigured such that the two charge pump arrays are in parallel. In this mode, the pump output may be taken from outputs 740 and 742 because a higher output current is needed by other circuits in the read-only memory chip. In algorithm mode, the outputs from the two arrays (i.e. the outputs from stages 4 and 8) are out-of-phase with each other. This may be accomplished by multiplexing both pairs of clock inputs. Two multiplexers 726, 732 may switch the clock inputs to the second array, effectively inverting the clock signals to the stages in the second array. This may cause the output from the second array (i.e. the output from stage eight) to be about 180 degrees out-of-phase with the output from the first array (i.e. the output of stage four). This arrangement may reduce the peak-to-peak ripple in the charge pump output to about 400 mV or less in certain embodiments.

The high current charge pump 701 includes eight discrete stages 702–716, the construction and operation of which are well known in the art and will not be described further herein. In programming or erase mode, the stages may be arranged into two arrays each having four stages, each stage being powered by voltage source 744. The first array 702–708 may terminate in charge pump output 740 and the second array 710–716 may terminate in a second charge pump output 742. Four clock inputs 718–724 may control the charge pumps 702–716. The first and second clock signals 718, 720 may directly connect to the first stage 702 and the third stage 706. The third and fourth clock signals 722, 724 may directly connect to the second stage 704 and the fourth stage 708. In response to enabling line 734, multiplexer 726 may pass either first and second clock signals 718, 720 or third and fourth clock signals 722, 724 to outputs 728, 730. In response to enabling line 734, multiplexer 732 may pass either first and second clock signals 718, 720 or third and fourth clock signals 722, 724 to outputs 736, 738. Outputs 728, 730 from multiplexer 726 may connect to the fifth stage 710 and the seventh stage 714. Outputs 736, 738 from multiplexer 732 may connect to the sixth stage 712 and the eighth stage 716. Enabling line 734 may control the multiplexer state to configure the charge pump for a program or erase algorithm when low, or to configure the charge pump for slew mode when high.

When enabling line 734 is high, the associated EEPROM may be in slew mode to provide increased voltage. The stages 702–716 may be series connected to supply charge to line 742 as it is driven by clock signal 724. Output 740 may drive the input to circuit 710 (by operation of the n-channel FET switch described above), and the charge transfer from output 740 may be approximately in-phase with the charge transfer from output 742. It should be noted that in slew mode, multiplexer 726 may pass signals 718, 720 to lines 728, 730 and that multiplexer 732 may pass signals 722, 724 to lines 736, 738. Because the same clock pair 722, 724 might control them, stages 708 and 716 may be in-phase while in slew mode. This arrangement may advantageously provide for the rapid and efficient charging of an associated low current, high voltage charge pump connected to output 742 during slew mode in certain embodiments.

When enabling line 734 is low, the associated EEPROM may be in algorithm mode to provide increased current. Output 740 may no longer be an input to circuit 710, and the charge transfer from output 740 may become out-of-phase with the charge transfer from output 742. Enabling line 734 may cause multiplexers 726 and 732 to switch. Thus, multiplexer 726 may pass signals 722, 724 to lines 728, 730, and multiplexer 732 may pass signals 718, 720 to lines 736, 738. Although stage 708 may still be controlled by clock signals 722, 724, stage 716 might now be controlled by clock signals 718, 720 when the EEPROM is in algorithm mode. The net effect is that the clock signals for stages 710–716 may each be shifted 180 degrees out-of-phase relative to the respective clock signals for stages 702–708. Thus, in algorithm mode, the output 742 of stage 716 may be shifted approximately 180 degrees relative to output 740 of stage 708.

The overall charge pumping operation in slew mode may proceed as follows. Clocks 718, 720 may cause stage 702 and stage 710 first to accumulate charge greater than their respective input voltage supplies (i.e. voltage source 744 for stage 702 and output 740 for stage 710), and then to transfer the charge to stages 704 and 712, respectively. This basic charge pump operation is well known in the art and will not be described in further detail here. Clocks 722, 724 may then cause stage 704 and stage 712 to accumulate an even greater charge and then to transfer the resultant charge to stages 706 and 714, respectively. Clocks 718, 720 may then cause stage 706 and stage 714 further to accumulate charge and then to transfer the resultant charge to stages 708 and 716, respectively. Clocks 722, 724 may then cause stage 708 and stage 716 to accumulate further charge and then to transfer the resultant charge to outputs 740 and 742, respectively. Output 740 may feed into circuit 710 (through the aforementioned n-channel FET switch) while output 742 may connect to an associated low current charge pump (not shown) to charge it to a predetermined voltage.

When the EEPROM enters algorithm mode to perform a program or erase operation, the stages 702–708 and 710–716 may be arranged into two parallel arrays of four stages each. Output 740 may be disconnected from circuit 710 (by operation of the aforementioned n-channel FET switch) and it may thereafter directly feed into the pump output in parallel with output 742. In algorithm mode, the enabling line 734 may go low, and the multiplexers 726 and 732 may switch the clock signals to the second array 710–716 so that clock signals 718, 720 may control stages 712, 716, and so that clock signals 722, 724 may control stages 710, 714. The charge pumping operation may proceed as in slew mode except that clocks 718, 720 (rather than clocks 722, 724) control the output from stage 716. Accordingly, the charge transfer of stage 716 may be about 180 degrees out-of-phase with the charge transfer of stage 708, which may be controlled by clock signals 722, 724.

Figure 8:
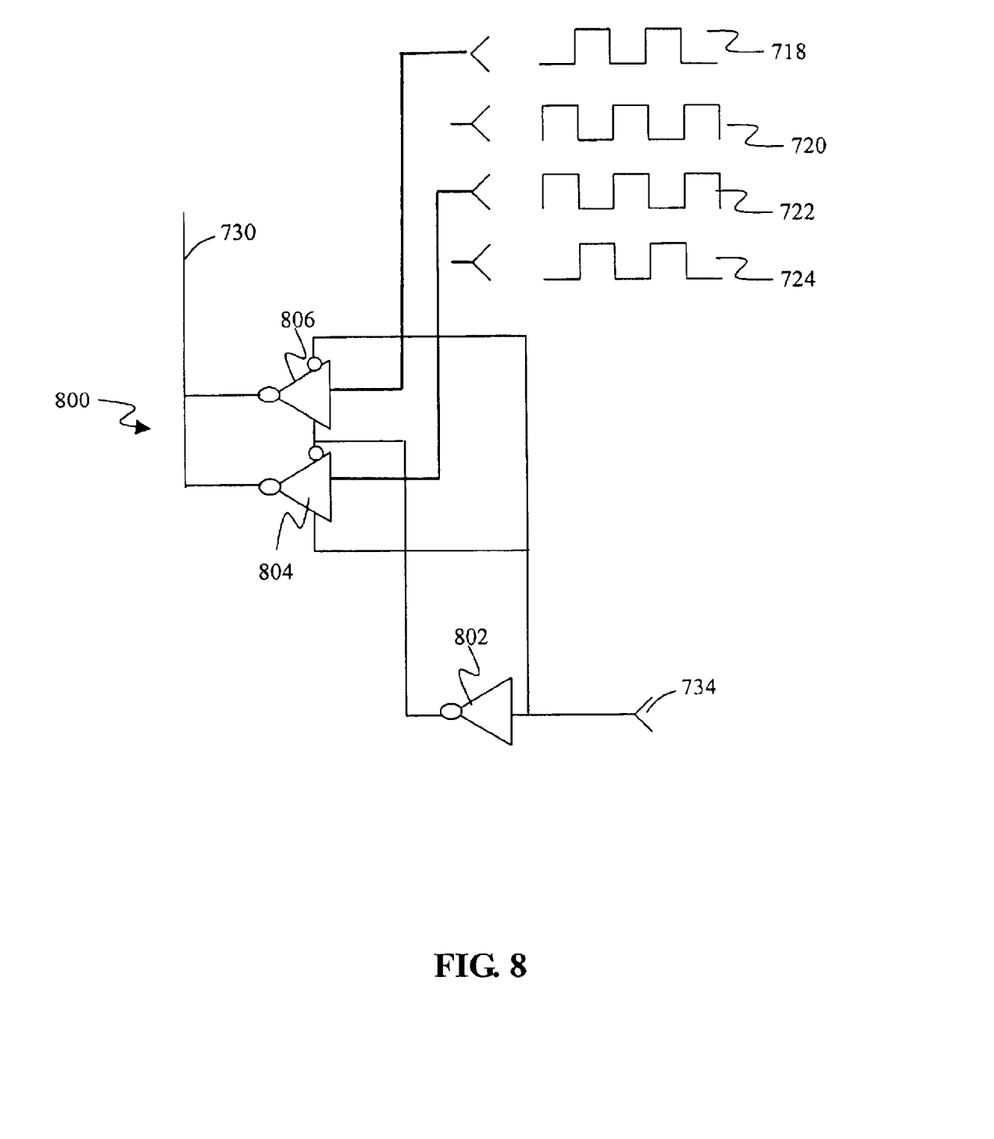

FIG. 8 depicts an exemplary multiplexing circuit 800 that optionally may be used in place of a portion of multiplexers 726 and 732. Clock signals 718 and 722 may feed inverting buffers 804 and 806, and enabling line 734 may feed inverter 802. The inverting buffers 804 and 806 may pass the inverse of the respective clock signal inputs when the bar (inverting) input is low and the other (non-inverting) input is high. In accordance with the present invention, the circuit may be configured to use any suitable devices to implement inverting buffers 804 and 806, including, for example, an appropriate arrangement of, buffer, tri-state, or inverting type devices. In slew mode, enabling line 734 may be high and output from inverter 802 may be low. Accordingly, the inverting buffer 804 may be enabled and provide a signal in phase with clock signal 718 to line 730. In algorithm mode, enabling line 734 may be low and the output from inverter 802 may be high. Inverting buffer 806 may thereby be enabled and provide a signal in phase with signal 722 to line 730. The exemplary illustrated circuit 800 permits enabling line 734 to determine which of clock signals 718, 722 appears on control line 730. The complete multiplexing function for circuit 700 may be achieved by replicating circuit 800 in like manner for remaining multiplexer outputs 728, 736, 738.

In other embodiments, the circuit of the instant invention may be used in connection with other types of charge pumps or voltage pumps, such as low current charge pumps. The charge pump controlled by the circuit may have any number of stages, arrays, and outputs. Each stage of each array may be freely substituted with other known or hereafter developed charge pumps so long as the substitute stages are subject to one or more control signals. The utility of the instant control circuit may not be limited to EEPROM control. The circuit may be implemented to phase-shift charge pump outputs to virtually any IC or discrete circuit element. The circuit 700 may also be readily modified to work with multiple discrete charge pumps by providing the desired number of clock signals to the multiplexers and electrically connecting the multiplexers to the various stages of the charge pumps. Any number of clock signals may be used to control the charge pumps in accordance with the present invention. The multiplexers 726, 732 or circuit 800 may be replaced with other suitable ICs, including PLA, PAL, PGA, decoder, inverter chain, and combinational logic circuits. The charge pump outputs need not be completely in-phase during slew mode. Nor do the control signal inputs need to be completely out-of-phase. Other phase-shifts, such as 45, 90, or 135 degrees, may be advantageously implemented to achieve one or more of the aforementioned benefits, such as output ripple reduction. Many other such modifications may be readily made to adapt the instant control circuit to other circuit environments.

Aspects of the invention provide for one or more of the following advantages. The circuit may permit selective control of charge pump output ripple. The ripple control circuit need not be activated during any particular portion of a clock cycle, but rather may be implemented only during operations or time periods in which charge pump output rippling is of particular concern. During other operative modes or time periods, permitting the charge pump to operate according to steady state clock or control signals may optimize its efficiency and speed. The circuit may be constructed with a minimum of logical devices or combinational logic, thereby significantly reducing size and cost. However, there exists tremendous flexibility to provide additional control by the addition of further logical devices or combinational logic, as desired. The circuit may also be readily adaptable to environments other than EEPROM charge pumps.

The control circuits for the above-described approaches may, in accordance with the present invention, also be used in conjunction with other types of charge pumps or voltage pumps, such as low or high current charge pumps. The charge pump cells controlled by circuits in accordance with the present invention may have any number of stages, arrays, or outputs. The circuits may be adapted to control pump output in virtually any integrated or discrete circuit design.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus comprising:
   a frequency synthesis device;
   a pump cell connected to the frequency synthesis device;
   a feedforward circuit connected to the frequency synthesis device to selectively activate and deactivate the frequency synthesis device in response to a pump cell output signal; and
   a differential amplifier to bias the frequency synthesis device.

2. The apparatus of claim 1, wherein the frequency synthesis device includes a voltage controlled oscillator.

3. The apparatus of claim 1, wherein the frequency synthesis device comprises a voltage controlled oscillator and a clock driver.

4. The apparatus of claim 2, wherein the frequency synthesis device further comprises a clock driver.

5. An apparatus comprising:
   a frequency synthesis device;
   a pump cell connected to the frequency synthesis device;
   a feedforward circuit connected to the frequency synthesis device to selectively activate and deactivate the frequency synthesis device in response to a pump cell output signal; and
   a biasing circuit to drive the frequency synthesis device in response to both the pump cell output signal and a reference signal.

6. The apparatus of claim 5, wherein the frequency synthesis device comprises a voltage controlled oscillator and a clock driver.

7. An apparatus comprising:
   a frequency synthesis device;
   a pump cell connected to the frequency synthesis device;
   a feedforward circuit connected to the frequency synthesis device to selectively activate and deactivate the frequency synthesis device in response to both a pump cell output signal and a reference signal; and
   a biasing circuit to drive the frequency synthesis device in response to both the pump cell output signal and the reference signal.

8. A method comprising:
receiving a feedback signal from a pump cell output;
generating a feedforward signal;
selectively activating or deactivating a frequency synthesis device coupled to the pump cell in response to the feedforward signal; and
differentially amplifying the feedback signal and a second signal to create a biasing signal for the frequency synthesis device.

9. The method of claim 8, further comprising transmitting the feedforward signal to the frequency synthesis device, and the frequency synthesis device comprises a voltage controlled oscillator and a clock driver.

10. The method of claim 8, wherein, in a first condition, the frequency synthesis device is to be activated or deactivated in response to the biasing signal and, in a second condition, the frequency synthesis device is to be activated or deactivated in response to the feedforward signal.

11. A method comprising:
receiving a feedback signal from a pump cell output;
generating a feedforward signal;
selectively activating or deactivating a frequency synthesis device coupled to the pump cell in response to the feedforward signal; and
biasing the frequency synthesis device in response to the pump cell output and a second signal.

12. The method of claim 11, further comprising transmitting the feedforward signal to the frequency synthesis device, and the frequency synthesis device comprises a voltage controlled oscillator and a clock driver.

13. A system comprising:
a processor unit coupled to a bus;
a main memory unit coupled to the bus; and
a long term memory unit coupled to the bus, said long term memory unit comprising:
a frequency synthesis device,
a pump cell connected to the frequency synthesis device,
a feedforward circuit connected to the frequency synthesis device to selectively activate and deactivate the frequency synthesis device in response to a pomp cell output signal,
a plurality of electrically-erasable programmable read-only memory cells coupled to the pump cell output, and
a differential amplifier to bias the frequency synthesis device.

14. An apparatus comprising:
a frequency synthesis device;
a pump cell connected to the frequency synthesis device;
a control circuit to bias the frequency synthesis device, the control circuit comprising a differential amplifier; and
a feedforward circuit to selectively activate and deactivate the frequency synthesis device in response to a pump cell output signal.

15. The apparatus of claim 14, wherein the frequency synthesis device includes a voltage controlled oscillator.

16. The apparatus of claim 14, wherein the frequency synthesis device comprises a voltage controlled oscillator and a clock driver.

17. The apparatus of claim 14, wherein the feedforward circuit is connected to the frequency synthesis device, and the frequency synthesis device comprises a voltage controlled oscillator and a clock driver.

18. The apparatus of claim 14, further comprising an electrically-erasable programmable read-only memory coupled to the pump cell output signal.

19. The apparatus of claim 14, wherein the feedforward circuit includes a comparator or a differential amplifier.

20. An apparatus comprising:
a frequency synthesis device;
a pump cell connected to the frequency synthesis device;
a control circuit to bias the frequency synthesis device, wherein the control circuit biases the frequency synthesis device in response to both a pump cell output signal and a reference signal; and
a feedforward circuit to selectively activate and deactivate the frequency synthesis device in response to the pump cell output signal.

21. An apparatus comprising:
a frequency synthesis device;
a pump cell connected to the frequency synthesis device;
a control circuit to bias the frequency synthesis device, wherein the control circuit biases the frequency synthesis device in response to both a pump cell output signal and a reference signal; and
a feedforward circuit to selectively activate and deactivate the frequency synthesis device in response to both the pump cell output signal and the reference signal.

22. A method comprising:
receiving a feedback signal from a pump cell having an output;
generating a feedforward signal to selectively activate or deactivate a frequency synthesis device coupled to the pump cell in response to the feedback signal; and
generating a signal to bias the frequency synthesis device;
wherein generating the signal to bias the frequency synthesis device comprises differentially amplifying the feedback signal and a second signal to create a biasing signal for the frequency synthesis device.

23. The method of claim 22, wherein the second signal is a reference signal.

24. The method of claim 22, further comprising transmitting the feedforward signal to the frequency synthesis device, and the frequency synthesis device comprises a voltage controlled oscillator and a clock driver.

25. The method of claim 23, further comprising transmitting the feedforward signal to the frequency synthesis device, and wherein the frequency synthesis device comprises a voltage controlled oscillator and a clock driver.

26. The method of claim 22, wherein the selective activation or deactivation is in response to both the pump cell output and a second signal.

27. The method of claim 22, further comprising programming an electrically-erasable programmable read-only memory with current supplied by the pump cell.

28. The method of claim 22, wherein, in a first condition, the frequency synthesis device is to be activated or deactivated in response to the biasing signal and, in a second condition, the frequency synthesis device is to be activated or deactivated in response to the feedforward signal.

29. The method of claim 22, further comprising comparing the feedback signal with the second signal to generate the feedforward signal.

30. A method comprising:
receiving a feedback signal from a pump cell having an output;
generating a feedforward signal to selectively activate or deactivate a frequency synthesis device coupled to the pump cell in response to the feedback signal; and generating a signal to bias the frequency synthesis device;

wherein the generation of the signal to bias the frequency synthesis device is in response to the pump cell output and a second signal.

31. A system comprising:

a processor unit coupled to a bus;

a main memory unit coupled to the bus; and a long term memory unit coupled to the bus, said long term memory unit comprising:
 a frequency synthesis device,
 a pump cell connected to the frequency synthesis device,
 a control circuit to bias the frequency synthesis device,
 a feedforward circuit to selectively activate and deactivate the frequency synthesis device in response to a pump cell output signal, and
 a plurality of electrically-erasable programmable read-only memory cells coupled to the pump cell output;
 wherein the control circuit comprises a differential amplifier to bias the frequency synthesis device.

32. The system of claim 31, wherein the frequency synthesis device includes a voltage controlled oscillator.

33. The system of claim 31, wherein the feedforward circuit includes a comparator or a differential amplifier.

* * * * *

UNITED STATES PATENT AND TRADEMARK OFFICE
CERTIFICATE OF CORRECTION

PATENT NO. : 6,836,176 B2
DATED : December 28, 2004
INVENTOR(S) : Raymond W. Zeng, Ravi P. Annavajjhala and Mary Frances Therese B. Yuvienco It is certified that error appears in the above-identified patent and that said Letters Patent is hereby corrected as shown below:

Column 11,
Line 41, please delete "pomp" and insert -- pump --.

Signed and Sealed this

Seventeenth Day of May, 2005

JON W. DUDAS
*Director of the United States Patent and Trademark Office*